United States Patent
Mathew et al.

(10) Patent No.: US 10,055,674 B2
(45) Date of Patent: Aug. 21, 2018

(54) CONFIDENCE ESTIMATION FOR OPTICAL FLOW

(71) Applicant: Texas Instruments Incorporated, Dallas, TX (US)

(72) Inventors: Manu Mathew, Bangalore (IN); Hrushikesh Tukaram Garud, Maharashtra (IN); Soyeb Noormohammed Nagori, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/073,940

(22) Filed: Mar. 18, 2016

(65) Prior Publication Data

US 2016/0275377 A1    Sep. 22, 2016

(30) Foreign Application Priority Data

Mar. 20, 2015  (IN) .......................... 1416/CHE/2015

(51) Int. Cl.
| | |
|---|---|
| *G06K 9/62* | (2006.01) |
| *G06T 5/00* | (2006.01) |
| *G06T 5/20* | (2006.01) |
| *G06T 7/269* | (2017.01) |
| *G06K 9/00* | (2006.01) |

(52) U.S. Cl.
CPC ....... *G06K 9/6282* (2013.01); *G06K 9/00791* (2013.01); *G06T 5/002* (2013.01); *G06T 5/20* (2013.01); *G06T 7/269* (2017.01); *G06T 2207/10016* (2013.01); *G06T 2207/20076* (2013.01); *G06T 2207/30168* (2013.01)

(58) Field of Classification Search
CPC ............ G06K 9/00718; G06K 9/6282; G06K 9/00797; G06T 5/002; G06T 5/20; G06F 17/30257; G06F 17/3024; H04N 1/40062
See application file for complete search history.

(56) References Cited

U.S. PATENT DOCUMENTS

| | | | | |
|---|---|---|---|---|
| 8,892,231 | B2* | 11/2014 | Cheng ..................... | G10L 25/81 700/94 |
| 2007/0154068 | A1* | 7/2007 | Stein ........................ | G01C 3/22 382/106 |
| 2014/0006334 | A1* | 1/2014 | Doria ................... | G06N 99/005 706/52 |
| 2016/0275377 | A1* | 9/2016 | Mathew ............... | G06K 9/6282 |
| 2017/0018076 | A1* | 1/2017 | Middlebrooks ...... | G06K 9/6267 |
| 2017/0206665 | A1* | 7/2017 | Mathew ................ | G06T 7/2066 |

* cited by examiner

*Primary Examiner* — Amir Alavi
(74) *Attorney, Agent, or Firm* — Kenneth Liu; Charles A. Brill; Frank D. Cimino

(57) ABSTRACT

A confidence map for optical flow gradients is constructed calculating a set of gradients for each pixel of an image, filtering said gradients and extracting confidence values from said gradients using a plurality of decision tree classifiers. A confidence map is then generated from said confidence values.

10 Claims, 4 Drawing Sheets

CONFIDENCE ESTIMATION FOR OPTICAL FLOW

CLAIM OF PRIORITY

This application claims priority under 35 U.S.C 119(e) (1) to Indian Provisional Application No. 1416/CHE/2015 filed Mar. 20, 2015.

TECHNICAL FIELD OF THE INVENTION

The technical field of this invention is optical flow estimation.

BACKGROUND OF THE INVENTION

Optical flow or optic flow is the pattern of apparent motion of objects, surfaces, and edges in a visual scene caused by the relative motion between an observer (an eye or a camera) and the scene. The concept of optical flow was introduced by the American psychologist James J. Gibson in the 1940s to describe the visual stimulus provided to animals moving through the world. Subsequently the term optical flow has been co-opted in the computer vision domain to describe pixel motion in between two temporally ordered images of the scene, and incorporate related techniques of estimation of pixel motion. The optical flow estimation techniques are further integrated in related techniques of image processing and navigation control.

Methods of navigation control are of special interest in advanced driver assistance systems (ADAS). Motion detection in ADAS is fundamental to solving various problems such as object segmentation, time-to-contact information, depth estimation, structure from motion and focus of expansion calculations etc. One of the most widely used techniques for motion detection is the optical flow estimation. Thus, when used in ADAS, accuracy and speed of the optical flow estimation is a critical component in guaranteeing overall reliability of the ADAS. Accordingly, there is a need for a real-time optical flow estimation system having sufficient accuracy in all possible scenarios.

Optical flow estimation is a challenging problem. There are many scenarios where the flow estimation can go wrong such as occlusions, a new object coming into the camera's field of view, or an object going out of the camera's field of view. Camera rotations can make it difficult (or sometimes impossible) to estimate the correct optical flow. Low visibility (night vision, rain or fog), noise in the image, high rates of motion etc., are some other difficult scenarios for optical flow estimation. Flow estimation can also be challenging around moving object boundaries.

The estimated optical flow algorithm is typically used by a higher level algorithm such as the object tracking algorithm. It is important for the higher level algorithm to know where the optical flow estimation is correct and where it is likely to be wrong—so that the higher level algorithm can either discard the potentially incorrect flow estimates or assign proper weight based on the estimated correctness of the optical flows. Accordingly there is a need for computing a confidence map associated with the optical flow. This confidence map then indicates the confidence in the optical flow estimation—whether the flow estimation is likely to be correct or not.

SUMMARY OF THE INVENTION

A method for estimating a score or measure for optical flow is shown that generates a confidence map indicating confidence limits or weights on a pixel by pixel basis. This allows higher level algorithms to assign lesser importance, or to ignore altogether areas of a frame that have defective optical flow values.

BRIEF DESCRIPTION OF THE DRAWINGS

These and other aspects of this invention are illustrated in the drawings, in which:
FIG. 4 shows a processor that the invention may be implemented on.

DETAILED DESCRIPTION OF PREFERRED EMBODIMENTS

This invention shows a dense optical flow estimation algorithm using a quasi-parametric approach, capable of accurate, highly precise and efficient optical flow estimation over a large range of relative pixel motions.

While there has been optical flow algorithms developed in the prior art, there has not been an attempt to generate a confidence map in real time, along with the optical flow. The estimated confidence map helps to understand which of the flow values are correct and which of them are potentially wrong.

Figure 1:
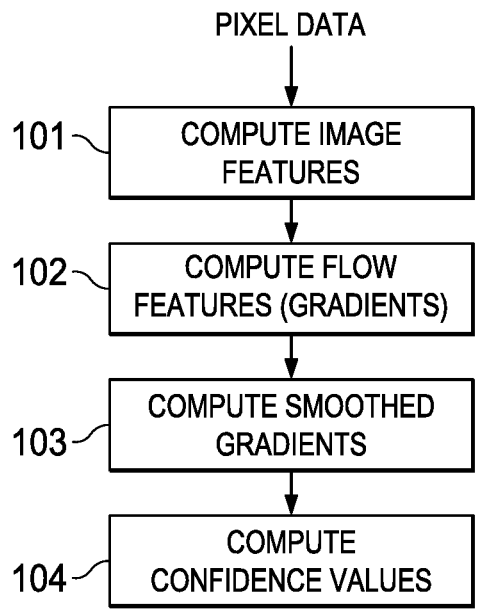
FIG. 1 shows a high level block diagram of the invention.

The described optical flow confidence map generation algorithm shown on FIG. 1 is implemented as follows:

For every pixel, a set of features are computed. The features include image features 101 and flow features 102. Smoothed versions 103 of the features are also computed.

These features are sent to a decision tree classifier 104 that outputs a classifier score. This classifier score is then converted to a confidence value.

The features used are gradients of flow, matching cost measures and gradients of the image for computation of the confidence measure. These are defined as:
Gradient of the U component of the optical flow (Gu)
Gradient of the V component of the optical flow (Gv)
Cost (or distance) corresponding to the best match (C0)
Delta matching cost=Second_best_cost-best_cost Cd= (C1-C0)
Gradient magnitude of the input image (Gm)
Su=Smoothed version of Gu
Sv=Smoothed version of Gv
S0=Smoothed version of C0
Sd=Smoothed version of Cd
Sm=Smoothed version of Gm Using the above 10 values, a feature vector of size 10 is constructed for every pixel:
Gu, Gv, C0, Cd, Gm, Su, Sv, S0, Sd, Sm This feature vector is then processed by a decision tree classifier to derive the confidence measure.

Gradients are computed as follows. Let X be the input to the gradient function, and for any location (i,j), a simplified form of the backward gradient is defined as:

$$g=[abs(X(i,j)-X(i-1,j))+abs(X(i,j)-X(i,j-1))]$$
$$G(i,j)=\min((g<<\text{GRADIENT\_SHIFT}),\text{GRADIENT\_MAX})$$

Typical range of GRADIENT_SHIFT is between 0 to 8 and that of GRADIENT_MAX 255 to 65535. The value of GRADIENT_MAX also depends on range of X itself.

The above gradient method is used to compute the gradients of the flow values (Gu, Gv), and the gradient of the image (Gm).

Figure 2:
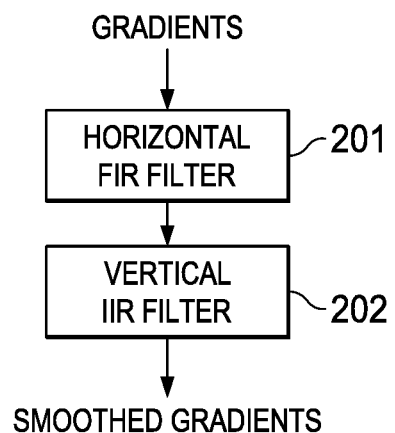
FIG. 2 shows a block diagram of the smoothing operation.

A smoothing operation is performed by a 2 dimensional separable combination of FIR and IIR filters as shown on FIG. 2. FIR filtering 201 is implemented in the horizontal direction followed by IIR filtering 202 in the vertical direction. FIR filters are more controllable and are seen to be best for this application from a quality point of view. However, using an FIR filter in vertical direction adds to the delay and increases the line size of the buffers required—therefore an IIR filter is used in the vertical direction.

For any location (i,j), a simplified form of the smoothing operation may be implemented as follows:

X is the input to the smoothing function,
SmoothH(i,j)=sum(X(i,j−8+m)); m=0, 1, . . . 17
where SmoothH(i,j) is the horizontally filtered version (intermediate value).

This is followed by IIR filtering vertically with the previous line of output as follows:

$$S(i,j)=(SmoothH(i,j)*SMOOTH\_ALPHA+ S(i-1,j)*SMOOTH\_BETA)$$

where S(i,j) is the output of the smoothing operation and S(i−1,j) is the corresponding output from the previous line. The above smoothing method is used to compute Su, Sv, S0, Sd and Sm.

Figure 3:
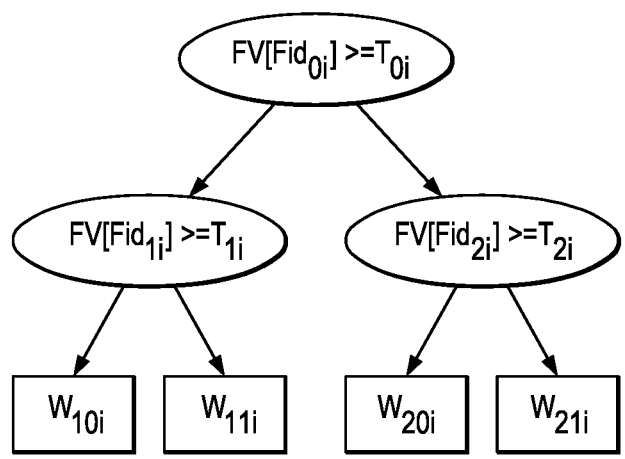
FIG. 3 shows the decision tree.

The 2 level decision tree shown in FIG. 3 then selects a weight based on input features and thresholds. Several decision trees are used in the implementation shown and weights are accumulated from each of them.

In FIG. 3, subscript 'i' indicates the ith decision tree.
FV indicates the Feature Vector array of size 10.
Fidx represents an index into the Feature Vector, taking values from 0 to 9.
The entries Thx are threshold values for comparisons.
Wxx are weight values used to generate scores.

In the configuration shown, a set 16 decision trees are used to convert the feature vectors into a score value. The values of the decision trees can be represented in Table 1:

TABLE 1

| | Tree Number | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Node 0 Fid$_0$ Th$_0$ | | | | | | | | | | | | | | | | |
| Node 1 Fid$_1$ Th$_1$ W$_{10}$ W$_{11}$ | | | | | | | | | | | | | | | | |
| Node 2 Fid$_2$ Th$_2$ W$_{20}$ W$_{21}$ | | | | | | | | | | | | | | | | |

For each column, the partial score Vi is computed that corresponds to one column of the above table:

$$Vi=((FV[Fid0[i]]<Th0[i])\&\&(FV[Fid1[i]]<Th1[i])) \\ *W10[i]+((FV[Fid0[i]]<Th0[i])\&\&(FV[Fid1[i]]>=Th1[i]))*W11[i]+((FV[Fid0[i]]>=Th0[i])\&\&(FV[Fid2[i]]<Th2[i])) \\ *W20[i]+((FV[Fid0[i]]>=Th0[i])\&\&(FV[Fid2[i]]>=Th2[i]))*W21[i];$$

The accumulated score V=(V0+V1+ . . . +V15) is the sum of the scores of 16 decision trees. This accumulated score V can exceed 16 bits.

The entries in the table are usually produced by a heuristic training algorithm with manually selected values.

The confidence map is calculated from the accumulated score V by scaling the accumulated score and clipping it to a suitable range—for example between 0 and 15. This can be done as follows:

$$CS=(V*OUTPUT\_MULT\_FACTOR\_LINEAR)>>OUTPUT\_SHIFT\_FACTOR$$

$$C=min(max(CS, -8), +7)+8$$

The confidence map, C, is thus quantized to discrete levels, for example 0, 1, . . . , 15 (4 bits) so it can be represented in fixed bit precision.

Figure 4:
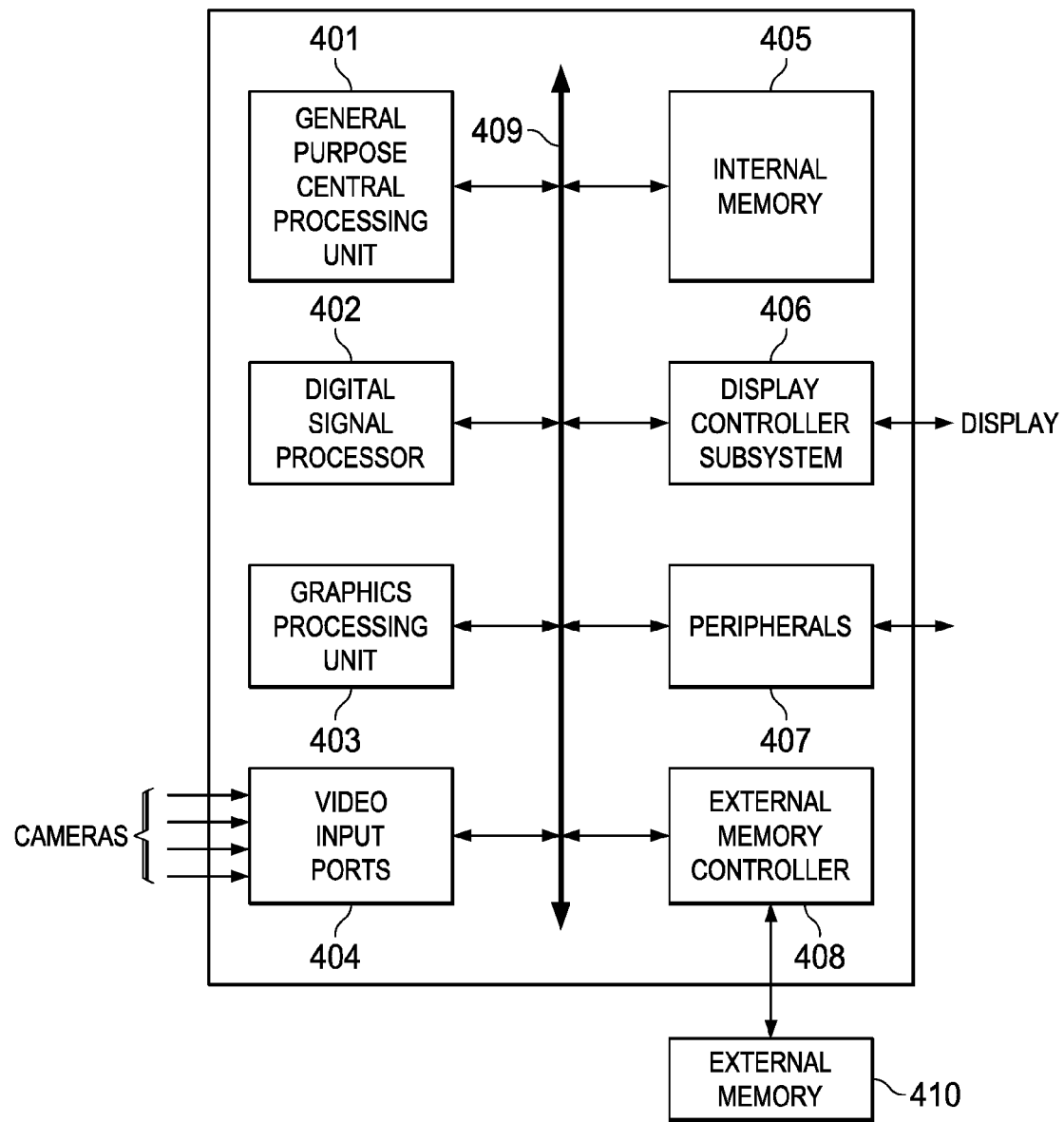

FIG. 4 shows a processor that may be used to implement the methods of this invention. The processor consists of a general purpose processing unit 401, a digital signal processor 402, a graphics processing unit 403, one or more video output ports 404, internal memory 405, a display controller subsystem 406, one or more peripherals 407, an external memory controller 408, and external memory 410. These system blocks are operable to communicate through bus 409.

Figure 5:
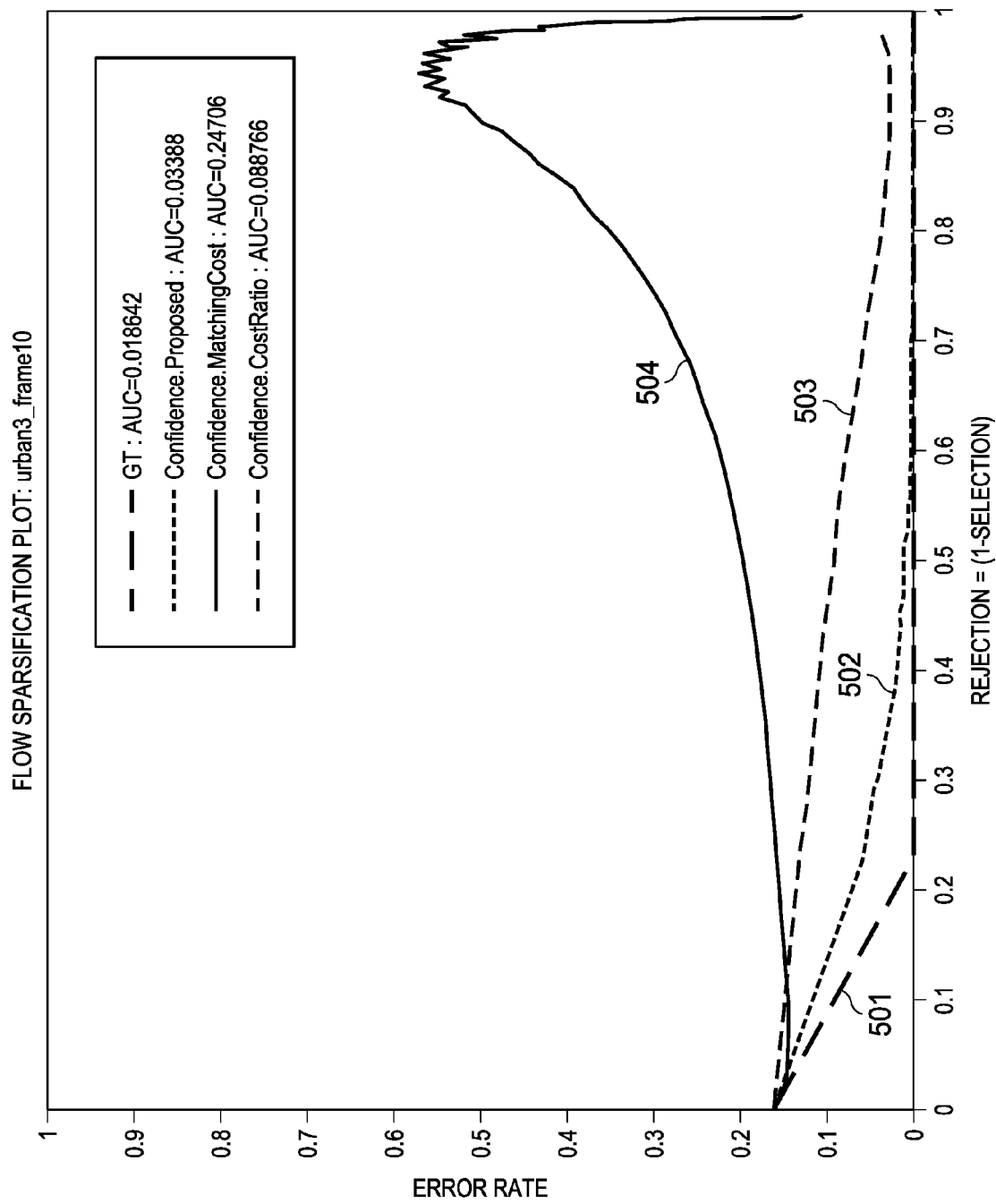
FIG. 5 shows a comparison of this invention and prior art methods.
Figure 6:
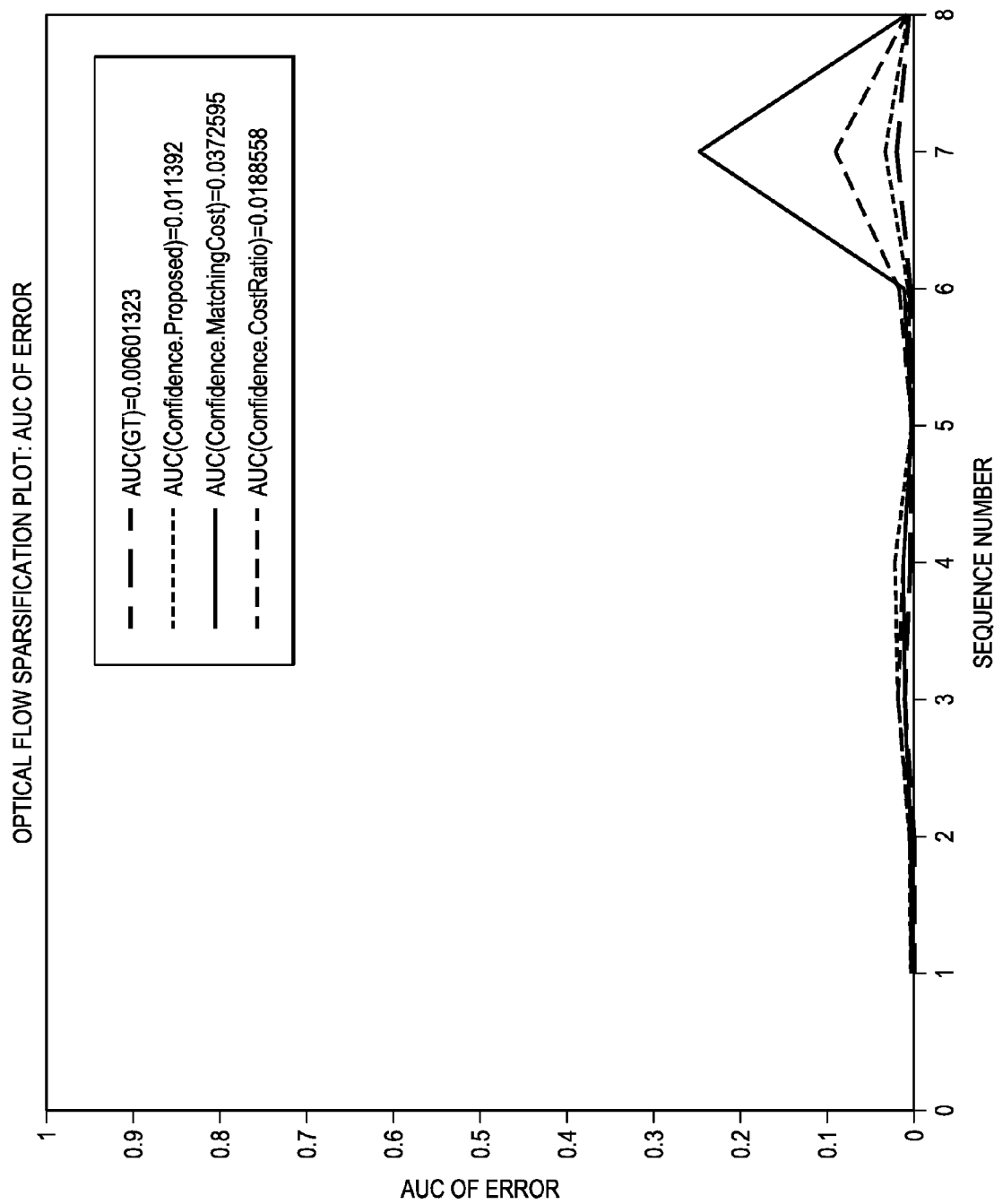
FIG. 6 shows a comparison between frames with varying relative motion.

FIGS. 5 and 6 show the performance of the method described in this invention, compared to methods used in the prior art. In these figures, matching cost 504 and the cost ratio 503 is compared to the performance 502 of this invention and to GT, the ground truth 501—this is the actual correctness of the optical flow. The methods are evaluated by looking at the AUC—the area under the curve. The better the match, the lower the AUC, as shown on FIG. 5.

FIG. 6 shows the AUC plot and the overall average AUC of various sequences. Ground truth (GT) AUC is the lowest at 0.6% as expected. The proposed method achieves an AUC of 1.1% which is quite close to the ground truth. Matching Cost (3.7%) and Cost Ratio (1.9%) achieve poorer AUCs, showing that the proposed method is more accurate compared to the other two methods from the prior art.

The AUC values are low for the sequences used in FIG. 6 since the sequences used have relatively small motion. However the error values will be much higher for typical automotive scenarios where the motion is large. In those scenarios, the proposed method will outperform the other two methods by a much larger margin.

Left-right consistency check is typically used in the prior art for confidence map estimation for stereo disparity computation. Similarly, for optical flow confidence estimation, one could use a forward-backward check—however the optical flow confidence map estimation shown in this invention is are able to generate accurate confidence estimates without need for explicit forward/backward check. This helps in reducing computation complexity significantly as performing the check would have roughly doubled computational complexity.

Variance or central gradient of flow has been seen to be used as features for optical flow confidence estimation in the prior art—this requires several neighboring pixels/lines and hence requires several line buffers for storage, with a delay in the output. However, in the approach shown a simple backward gradient is used with no additional delay—and only one previous line is required for the gradient computation.

Confidence estimation in the prior art uses either features obtained while running the optical flow for a smaller resolution, or features scaled by FIR filtering/resizing. Both these approaches are complex to implement in hardware. The first approach needs data from the smaller resolution to be transported via external memory to the stage were the higher resolution optical flow is computed. The second approach needs several lines of features for the filtering operation.

What is claimed is:

1. A method of confidence estimation for optical flow comprising the steps of:
computing a set of features for each pixel of an input image, wherein the set of features includes an image feature, a matching cost, and a flow feature, wherein the image feature includes an image gradient feature, wherein the flow feature includes a flow gradient feature, and wherein computing the set of features comprises:
computing a gradient Gu of a U component of the optical flow;
computing a gradient Gv of a V component of the optical flow;
computing a cost (or distance) C0 corresponding to a best match;
computing a Delta matching cost Cd; and
computing a gradient magnitude Gm of the input image;
computing a smoothed version of each feature of the set of features;
constructing a feature vector for each pixel of the input image based on the set of features and the smoothed versions of the set of features;
computing a classifier score from the feature vector using a set of decision tree classifiers; and
converting the classifier score into a confidence score, the confidence score representing a confidence of the optical flow.

2. The method of claim 1, wherein:
computing either the image gradient or the flow gradient is implemented as follows:

$$g=[abs(X(i,j)-X(i-1,j))+abs(X(i,j)-X(i,j-1))]$$
$$G(i,j)=\min((g<<\text{GRADIENT\_SHIFT}),\text{GRADIENT\_MAX}),$$

wherein X is an input for a location (i,j).

3. The method of claim 1, wherein:
computing the smoothed versions of the image gradient feature and the flow gradient feature comprises:
applying an FIR filter to the image gradient feature and the flow gradient feature in the horizontal dimension; and
applying an IIR filter to the image gradient feature and the flow gradient feature in the vertical dimension.

4. The method of claim 3, wherein:
Said FIR filter is implemented as follows:

$$\text{Smooth}H(I,j)=\text{sum}(X(i,j-8+m)); m=0, 1, \ldots 17$$

wherein X is an input gradient to a smoothing function and Smooth(i,j) is a horizontally filtered gradient.

5. The method of claim 3, wherein:
the IIR filter is implemented as follows:

$$S(i,j)=(\text{Smooth}H(i,j)*\text{SMOOTH\_ALPHA}+S(i-1,j)*\text{SMOOTH\_BETA}),$$

wherein S(i,j) is an output of a smoothing operation, SmoothH(i,j) is an output of the FIR filter, and S(i−1,j) is a corresponding output from previous line of the optical flow.

6. The method of claim 1, wherein:
computing the smoothed version of each feature of the set of features comprising:
computing a smoothed version Su of Gu;
computing a smoothed version Sv of Gv;
computing a smoothed version S0 of C0;
computing a smoothed version Sd of Cd; and
computing a smoothed version Sm of Gm;
the feature vector is constructed using Gu, Gv, C0, Cd, Gm, Su, Sv, S0, Sd, and Sm, and is processed by the set of decision tree classifiers to extract confidence values.

7. The method of claim 1, wherein:
the confidence score is determined based at least partially on a confidence map constructed from accumulated classifier scores from the set of decision tree classifiers.

8. A method of confidence estimation for optical flow comprising the steps of:
computing a set of features for each pixel of an input image, wherein the set of features includes an image feature, a matching cost, and a flow feature;
computing a smoothed version of each feature of the set of features by:
computing a smoothed version Su of Gu, wherein Gu is a gradient of a U component of the optical flow;
computing a smoothed version Sv of Gv, wherein Gv is a gradient of a V component of the optical flow;
computing a smoothed version S0 of C0, wherein C0 is a cost or distance corresponding to a best match;
computing a smoothed version Sd of Cd, wherein Cd is a delta matching cost; and
computing a smoothed version Sm of Gm, wherein Gm is a gradient magnitude of the input image;
constructing a feature vector for each pixel of the input image;
computing a classifier score from the feature vector using set of decision tree classifiers; and
converting the classifier score into a confidence score, the confidence score representing a confidence of the optical flow.

9. The method of claim 8, wherein:
the feature vector is constructed using Gu, Gv, C0, Cd, Gm, Su, Sv, S0, Sd, and Sm, and is processed by the set of decision tree classifier to extract confidence values.

10. The method of claim 8, wherein:
the confidence score is determined based at least partially on a confidence map constructed from accumulated classifier scores from the set of decision tree classifiers.

* * * * *